(12) United States Patent
Dalton

(10) Patent No.: US 8,096,112 B2
(45) Date of Patent: Jan. 17, 2012

(54) EXHAUST AFTER-TREATMENT SYSTEM HAVING A SECONDARY TANK

(75) Inventor: Dale Arnold Dalton, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 969 days.

(21) Appl. No.: 11/905,332

(22) Filed: Sep. 28, 2007

(65) Prior Publication Data

US 2009/0084095 A1 Apr. 2, 2009

(51) Int. Cl.
*F01N 3/00* (2006.01)
(52) U.S. Cl. .............. 60/295; 60/284; 60/286; 239/130; 239/133; 137/571; 137/341; 222/146.2
(58) Field of Classification Search .............. 60/274, 60/284, 285, 286, 295, 299, 300, 301, 303, 60/320; 137/571, 341; 239/284.1, 130, 303, 239/133, 135; 222/29, 144.5–145.8, 146.2, 222/146.5
See application file for complete search history.

(56) References Cited

U.S. PATENT DOCUMENTS

| | | | |
|---|---|---|---|
| 5,884,475 A | 3/1999 | Hoffman et al. | |
| 6,223,526 B1 | 5/2001 | Wissler et al. | |
| 6,810,661 B2 | 11/2004 | Lambert et al. | |
| 6,928,807 B2 * | 8/2005 | Jacob et al. | 60/286 |
| 7,017,336 B2 | 3/2006 | Stiermann | |
| 7,836,684 B2 * | 11/2010 | Starck et al. | 60/286 |
| 2003/0033799 A1 | 2/2003 | Scheying | |
| 2006/0196172 A1 | 9/2006 | Johnson et al. | |
| 2006/0236679 A1 | 10/2006 | Meyer et al. | |
| 2007/0068525 A1 * | 3/2007 | Offenhuber et al. | 128/204.21 |
| 2007/0084193 A1 | 4/2007 | Levin | |
| 2007/0101700 A1 | 5/2007 | Masaki et al. | |
| 2007/0119153 A1 | 5/2007 | Peirz et al. | |
| 2007/0157602 A1 | 7/2007 | Gschwind | |
| 2007/0163232 A1 | 7/2007 | Ueno | |
| 2007/0163245 A1 * | 7/2007 | Sheridan et al. | 60/286 |
| 2007/0202019 A1 * | 8/2007 | Nishina et al. | 422/163 |
| 2008/0066453 A1 * | 3/2008 | Oberski et al. | 60/286 |

FOREIGN PATENT DOCUMENTS

| | | |
|---|---|---|
| DE | 102004051746 | 4/2006 |
| EP | 0928884 | 7/1999 |
| JP | 2005291086 | 10/2005 |
| WO | WO 2006087553 A1 * | 8/2006 |
| WO | WO2006131201 | * 12/2006 |
| WO | 2007/017080 | 2/2007 |

\* cited by examiner

*Primary Examiner* — Thomas Denion
*Assistant Examiner* — Jesse Bogue
(74) *Attorney, Agent, or Firm* — Finnegan, Henderson, Farabow, Garrett & Dunner LLP

(57) ABSTRACT

An exhaust after-treatment system having a main tank configured to retain and supply a reductant is disclosed. The exhaust after-treatment system includes a main heat source disposed in the main tank and configured to thaw the reductant. The exhaust after-treatment system also includes a secondary tank configured to retain a supply of reductant and a pump configured to pass reductant from the secondary tank to the main tank. The exhaust after-treatment system further includes a secondary heat source configured to thaw the reductant within the secondary tank.

20 Claims, 2 Drawing Sheets

EXHAUST AFTER-TREATMENT SYSTEM HAVING A SECONDARY TANK

TECHNICAL FIELD

The present disclosure is directed to exhaust after-treatment system and, more particularly, to an exhaust after-treatment system having a secondary tank.

BACKGROUND

Internal combustion engines, including diesel engines, gasoline engines, gaseous fuel-powered engines, and other engines known in the art exhaust a complex mixture of air pollutants. These air pollutants are composed of gaseous compounds, such as, for example, the oxides of nitrogen (NOx). Due to increased awareness of the environment, exhaust emission standards have become more stringent, and the amount of NOx emitted from an engine may be regulated depending on the type of engine, size of engine, and/or class of engine. In order to ensure compliance with the regulation of these compounds, some engine manufacturers have implemented a strategy called Selective Catalytic Reduction (SCR). SCR is a process where a gaseous or liquid reductant (most commonly a urea/water solution) is added to the exhaust gas stream of an engine and absorbed onto a catalyst. The reductant reacts with NOx in the exhaust gas to form $H_2O$ and $N_2$, thereby reducing harmful emissions.

Although SCR can be effective, the reductant can be problematic in both cold and hot temperatures. Specifically, urea at a 32% concentration has a freezing point of about −11° C. and, thus, may freeze and become useless in some environments. The freezing temperature may rise with an increase or decrease in concentration, which may occur as water evaporates. Typically, an electric heater is used to thaw the urea. However, after thawing the urea in the immediate vicinity of the heater, the thawed urea may immediately be consumed by the SCR process. If urea is used faster than it can be thawed, an air gap may be created between the heater and the rest of the frozen urea. This air gap may act as an insulator and decrease the effectiveness of the heater in thawing the rest of the urea. Additionally, urea may begin to decompose at a temperature of about 133° C. The decomposition of urea prior to passing through the SCR system may hinder the SCR process. To prevent the decomposition of urea caused by heating, the urea storage tank may be placed away from areas that could exceed the decomposition temperature (i.e. away from the engine).

One method aimed at overcoming the temperature limitations of urea is described in US Patent Application Publication No. 2007/0157602 (the '602 publication) issued to Gschwind on Jul. 12, 2007. Specifically, the '602 publication discloses a tank system having a melting tank and a main tank, the melting tank being at least large enough to hold a cold start volume of reductant. The melting tank is either attached to or disposed within the main tank as a single unit, or is detached and separated from the main tank. The disclosed tank system of the '602 publication passes urea from the main tank to the melting tank where the urea is heated and then passed to a liquid consumer, which discharges the urea into an exhaust gas stream. In the event of a cold start where the urea supply of the main tank is frozen, the melting tank is configured to thaw urea via an electric heating element, giving time for the main tank to melt on its own.

Although the tank system of the '602 publication may suitably thaw the urea within the melting tank, the urea within the main tank may still remain frozen when the melting tank is emptied. Thus, once the urea within the melting tank has been used, the SCR system is once again without a supply of urea. And, the '602 publication fails to address the problem of urea overheating.

The exhaust after-treatment system of the present disclosure solves one or more of the problems set forth above.

SUMMARY OF THE INVENTION

One aspect of the present disclosure is directed to an exhaust after-treatment system. The exhaust after-treatment system may include a main tank configured to retain a supply of reductant, and a main heat source disposed within the main tank to heat the reductant. The exhaust after-treatment system may further include a secondary tank configured to retain a supply of reductant and a pump configured to pass reductant from the secondary tank to the main tank.

Another aspect of the present disclosure is directed to a method of operating an exhaust after-treatment system. The method may include thawing reductant at a first location and at a second location. The method may additionally include directing reductant from the second location to the first location to facilitate the thawing of reductant at the first location.

DETAILED DESCRIPTION

Figure 1:
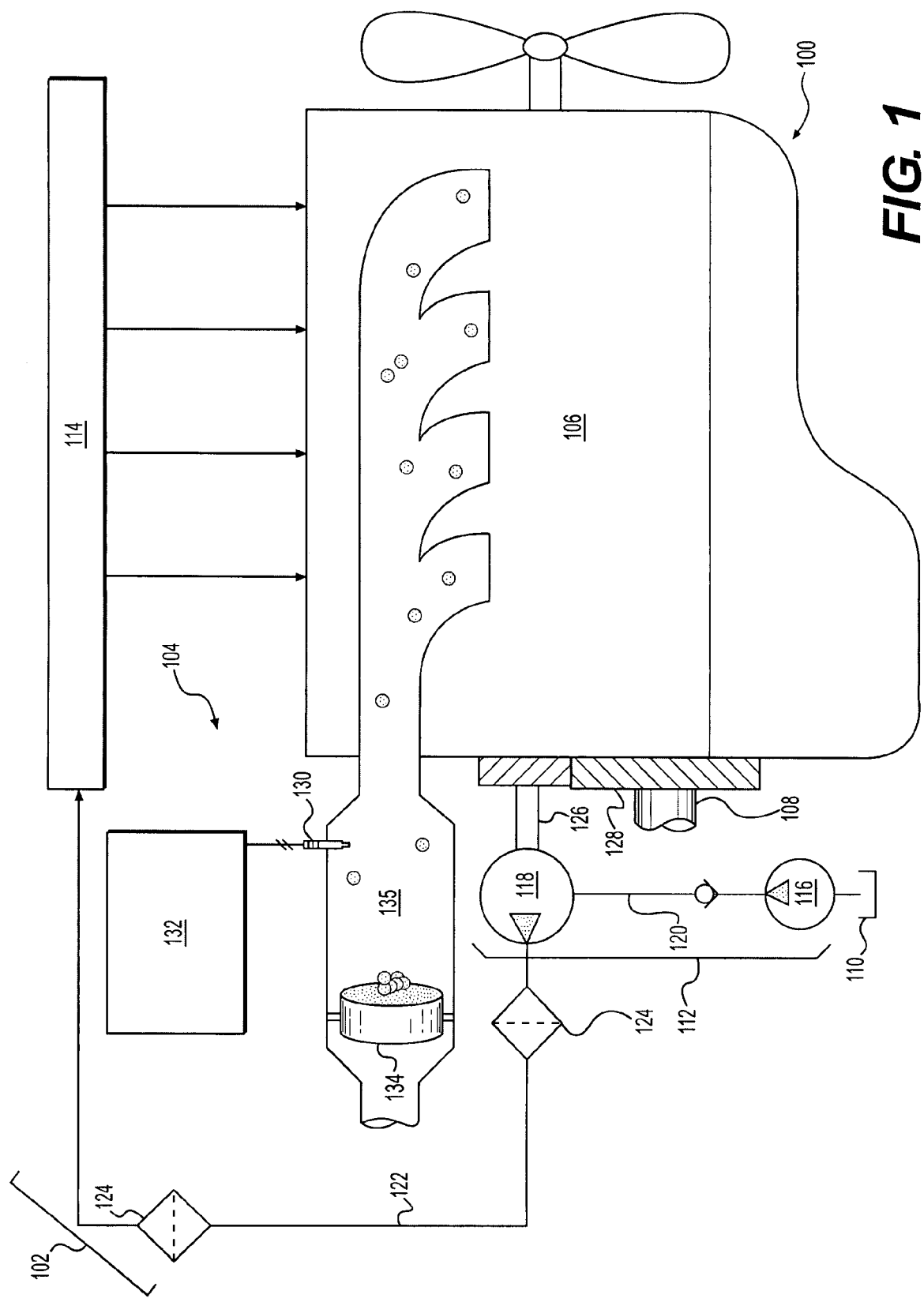
FIG. 1 is a schematic and diagrammatic illustration of an exemplary disclosed power unit.

FIG. 1 illustrates a power unit 100. For the purposes of this disclosure, power unit 100 is depicted and described as a four-stroke diesel engine. One skilled in the art will recognize, however, that power unit 100 may be any other type of internal or external combustion engine, such as, for example, a gasoline or a gaseous fuel-powered engine. Power unit 100 may include an engine block 106 that at least partially defines a plurality of combustion chambers (not shown). In the illustrated embodiment, power unit 100 includes four combustion chambers. However, it is contemplated that power unit 100 may include a greater or lesser number of combustion chambers and that the combustion chambers may be disposed in an "in-line" configuration, a "V" configuration, or any other suitable configuration.

As also shown in FIG. 1, power unit 100 may include a crankshaft 108 that is rotatably disposed within engine block 106. A connecting rod (not shown) may connect a plurality of pistons (not shown) to crankshaft 108 so that a sliding motion of each piston within the respective combustion chamber results in a rotation of crankshaft 108. Similarly, a rotation of crankshaft 108 may result in a sliding motion of the pistons.

A fuel system 102 may be associated with power unit 100 and include components that cooperate to deliver injections of pressurized fuel into each of the combustion chambers of power unit 100. Specifically, fuel system 102 may include a tank 110 configured to hold a supply of fuel, and a fuel pumping arrangement 112 configured to pressurize the fuel and direct the pressurized fuel to a plurality of fuel injectors (not shown) by way of a manifold 114. In one embodiment, fuel system 102 may be a common rail system.

Fuel pumping arrangement 112, shown in FIG. 1, may include one or more pumping devices that function to increase the pressure of the fuel and direct one or more pressurized streams of fuel to manifold 114. In the common rail example, fuel pumping arrangement 112 may include a low pressure source 116 and a high pressure source 118 disposed in series and fluidly connected by way of a fuel line 120. Low pressure source 116 may embody a transfer pump that provides low pressure feed to high pressure source 118. High pressure source 118 may be connected to manifold 114 by way of a fuel line 122. One or more filtering elements 124, such as a primary filter and a secondary filter, may be disposed within fuel line 122 in series relation to remove debris and/or water from the fuel pressurized by fuel pumping arrangement 112.

One or both of low and high pressure sources 116, 118 may be operatively connected to power unit 100 and driven by crankshaft 108. Low and/or high pressure sources 116, 118 may be connected with crankshaft 108 in any manner readily apparent to one skilled in the art where a rotation of crankshaft 108 will result in a corresponding driving rotation of a pump shaft. For example, a pump driveshaft 126 of high pressure source 118 is shown in FIG. 1 as being connected to crankshaft 108 through a gear train 128. It is contemplated, however, that one or both of low and high pressure sources 116, 118 may alternatively be driven electrically, hydraulically, pneumatically, or in any other appropriate manner. It is further contemplated that fuel system 102 may alternatively embody another type of fuel system, such as, for example, a mechanical unit fuel injector system where the pressure of the injected fuel is generated or enhanced within individual injectors without the use of a high pressure source.

An exhaust system 104 may also be associated with power unit 100 and be configured to direct exhaust gas from power unit 100 to the atmosphere and to reduce the amount of harmful constituents within the expelled exhaust gas. As illustrated in FIG. 1, exhaust system 104 may include an exhaust after-treatment system 132 configured to retain and inject a reductant into an exhaust passageway 135 at a location upstream of a catalyst substrate 134. In one example, nitrogen oxide (NOx) within the exhaust gas passing through catalyst substrate 134 may react with the reductant to convert the NOx into $N_2$, an innocuous gas. The reductant may include, for example, urea, ammonia, or Adblue®.

Figure 2:
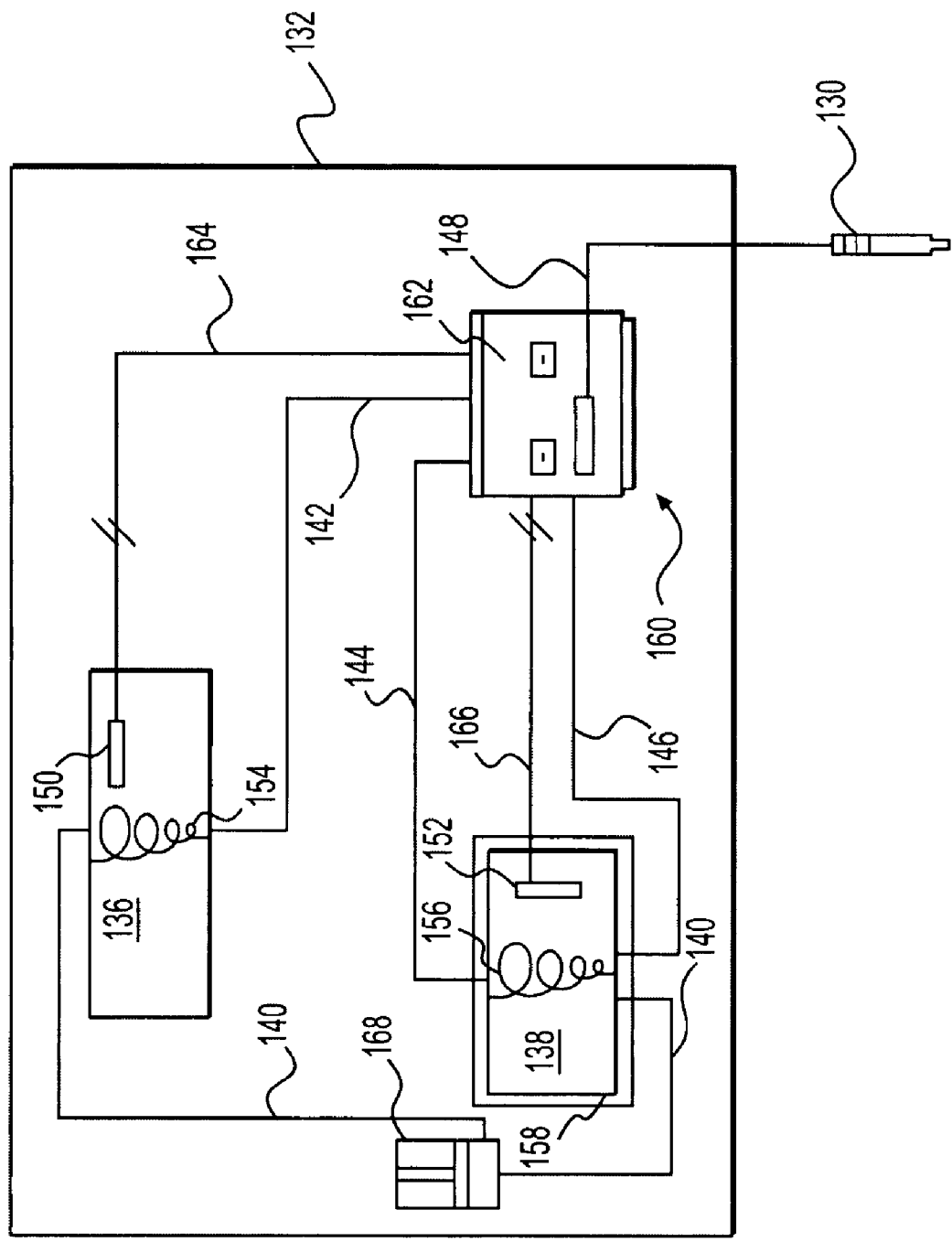
FIG. 2 is a schematic and diagrammatic illustration of an exemplary disclosed exhaust after-treatment system that may be used with the power unit of FIG. 1.

Catalyst substrate 134 may be made from a variety of materials. For example, catalyst substrate 134 may include a support material and a metal promoter dispersed within the catalyst support material. The support material may include at least one of alumina, zeolite, aluminophosphates, hexaluminates, aluminosilicates, zirconates, titanosilicates, and titanates; and the metal promoter may include silver metal (Ag). Combinations of these materials may be used and the support material may be chosen based on the type of fuel used, the reductant used, the air to fuel-vapor ratio desired, and/or for conformity with environmental standards. One of ordinary skill in the art will recognize that numerous other catalyst compositions may be used without departing from the scope of this disclosure. Further, multiple catalytic devices may be included with exhaust system 104, if desired As shown in FIG. 2, exhaust after-treatment system 132 may include a supply of reductant and multiple components to retain, condition, direct, and inject the reductant into exhaust passageway 135 (referring to FIG. 1). In particular, exhaust after-treatment system 132 may include an injector 130, a main tank 136, a secondary tank 138, and a control system 160. Main and secondary tanks 136, 138 may retain the supply of reductant and pass reductant to injector 130. Control system 160 may regulate the operation of exhaust after-treatment system 132. Specifically, control system 160 may monitor reductant properties and direct a flow of reductant from main and/or secondary tanks 136, 138 to injector 130. Injector 130 may be controlled to receive a flow of reductant and inject it into a stream of exhaust gas at predetermined pressures and timings.

Exhaust after-treatment system 132 may include multiple reductant lines 140, 142, 144, 146, and 148 configured to pass reductant from one component of exhaust after-treatment system 132 to another. Reductant lines 140, 142, 144, 146, and 148 may be tubular hoses or any other suitable lines configured to pass a fluid therein. In some embodiments, reductant lines 140, 142, 144, 146, and 148 may be configured to withstand cold and hot temperatures, and may be wrapped with a long cable-like electric heating element and/or covered with a thermal insulator to melt frozen reductant contained therein and/or to prevent freezing. Reductant supply line 140 may fluidly connect a bottom portion of secondary tank 138 to a top portion of main tank 136 and serve as a reductant supply line to main tank 136. Reductant exit line 142 may be connected to a bottom portion of main tank 136 and, together with reductant line 146, may fluidly connect main and secondary tanks 136, 138 to control system 160, respectively, to serve as reductant supply lines to injector 130. Reductant line 146 may connect to a bottom portion of secondary tank 138. Reductant line 144 may fluidly connect a top portion of secondary tank 138 to control system 160 to allow a return flow of reductant to secondary tank 138. Control system 160 may be fluidly connected to injector 130 by way of reductant line 148, allowing control system 160 to direct a flow of reductant to injector 130. It is contemplated that one or more valves (not shown) may be associated with reductant lines 140, 142, 144, and 148 to facilitate the operation of control system 160 and/or prevent back flow within reductant lines 140, 142, 144, and 148, if desired.

Main tank 136 may be located on or around a machine (not shown) associated with power unit 100. Main tank 136 may retain a volume of reductant that is a desired percentage of the volume of tank 110. In one exemplary embodiment the desired percentage may be about 5-13 percent, Secondary tank 138 may be much smaller than main tank 136 and configured to retain only enough reductant to operate exhaust system 104 for a predetermined amount of time. In one example the predetermined amount of time may be about 2-3 hours of standard power unit operation. The 2-3 hours of reductant supply may equate to about 1 percent of the volume of tank 110, or, about 1 or more gallons. Secondary tank 138 may be located near power unit 100, thereby utilizing heat from power unit 100 to heat frozen reductant stored within secondary tank 138. An insulating shell 158 may encase secondary tank 138 to help retain heat absorbed from power unit 100. It is contemplated that main tank 136 may also be encased with an insulating shell 158, if desired. It is further contemplated that secondary tank 138 may be located in other locations (i.e. distal from power unit 100) on or around a machine associated with power unit 100, as needed or desired.

Main and secondary tanks 136, 138 may be configured to melt reductant contained therein by heating. Main and secondary tanks 136, 138 may be configured such that the upper portions are smaller than the lower portions to help gravity in pulling frozen reductant toward the bottom of main and secondary tanks 136, 138. In particular, main and secondary tanks 136, 138 may include a main heat source 154 and a secondary heat source 156, respectively, to help maintain reductant in a liquid state. That is, main heat source 154 and secondary heat source 156 may heat frozen or freezing reductant to return the reductant to a liquid state. Main and secondary heat source 154, 156 may be an electric heating coil configured in a spiral or conical shape. That is, main and secondary heat source 154, 156 may embody a spiral configuration with a decreasing diameter from top to bottom preventing frozen urea from lodging at the top of main and secondary tanks 136, 138. The spiral configuration of main and secondary heat source 154, 156 would allow gravity to pull any frozen urea inside spiral configuration of main and secondary heat source 154, 156 downward, thus keeping it in contact with main and secondary heat source 154, 156. The spiral configuration of main and secondary heat source 154, 156 may also inhibit frozen reductant from lodging outside the cone. The larger diameter of main heat source 154 may be located near the connection of reductant supply line 140 and the smaller diameter near reductant exit line 142 (referring to FIG. 2). The larger diameter of secondary heat source 156 may be located near the connection of reductant line 144 and the smaller diameter near reductant lines 140 and 146.

Additionally, thermal waste energy from engine block 106 may be directed to or through main tank 136, thereby utilizing otherwise wasted energy from exhaust system 104 or other associated systems of power unit 100 to facilitate reductant thawing. Other systems of power unit 100 may additionally or alternatively provide thermal waste energy to secondary tank 138 to facilitate thawing, such as, for example, fuel system 102, a coolant system, a lubricant system, and/or a hydraulic tool system.

Control system 160 may include multiple components that cooperate to thaw and direct reductant according to various input signals. Specifically, control system 160 may include a plurality of sensors 150, 152, a controller 162, and a pump 168. Sensors 150, 152 may be in communication with controller 162 via communication lines 164 and 166, respectively, and be configured to generate input signals indicative of reductant parameters within main and secondary tanks 136, 138 and/or temperatures of main and secondary tanks 136, 138. Specifically, sensors 150, 152 may generate signals indicative of an amount, temperature, rate of supply, state, quality and/or any other parameters known in the art. Sensors 150, 152 may be disposed, respectively, within and/or adjacent to a wall of main and secondary tanks 136, 138. Pump 168 may fluidly communicate with reductant supply line 140 to pressurize reductant passing from secondary tank 138 to main tank 136, from main tank 136 to secondary tank 138, and from control system 160 to injector 130. It is contemplated that additional pumps may be used, if desired.

Control system 160 may control operation of injector 130, main and secondary heat sources 154, 156 and pump 168 in response to one or more inputs. For example, based on input from sensors 150, 152, controller 162 may regulate and direct reductant from main tank 136 and/or secondary tank 138 to injector 130 via reductant lines 142, 144, and 148. That is, given an input from sensor 150 indicating that reductant within main tank 136 is frozen, controller 162 may operate main heat source 154 to thaw reductant therein. Substantially, simultaneously, controller 162 may direct reductant from secondary tank 138 to injector 130 for the SCR process and to main tank 136 via reductant supply line 140 to facilitate the thawing of reductant therein. Reductant passed to main tank 136 may be circulated back to secondary tank 138 via reductant lines 142, 144 after passing through main tank 136 the passage created by main heat source 154. Alternatively, reductant may be passed from main tank 136 to injector 130 via reductant line 148. In another example, given an input from sensor 152 indicating reductant within secondary tank 138 is frozen or freezing, controller 162 may operate secondary heat source 156 to facilitate thawing reductant therein. It is contemplated that given the appropriate signal from sensors 150, 152, controller 162 may direct reductant from either main tank 136 or secondary tank 136, as desired.

Control system 160 may additionally be configured to block reductant from flowing into secondary tank 138 and to empty secondary tank 138. That is, given an appropriate input from sensor 152, such as, for example, an input indicating that the temperature of reductant within secondary tank 138 has exceeded or is nearing a critical temperature, controller 162 may operate a valve (not shown) associated with reductant line 144 and/or 142 to stop reductant from entering secondary tank 138. Substantially simultaneously, controller 162 may also direct all remaining reductant within secondary tank 138 into main tank 136, thus emptying secondary tank 138. The critical temperature at which controller 162 may empty secondary tank 138 is contemplated to be less than the decomposition temperature or any other temperature known in the art that my inhibit the proper performance of the reductant within catalyst substrate 134. It is contemplated that input from components and systems other than sensors 150, 152 may also affect the operation of pump 168, main and secondary heat sources 154, 156, and/or injector 130, if desired.

Controller 162 may embody a single microprocessor or multiple microprocessors that include a means for controlling an operation of exhaust after-treatment system 132. Numerous commercially available microprocessors can be configured to perform the functions of controller 162. It should be appreciated that controller 162 could readily embody a general machine or power unit microprocessor capable of controlling numerous work machine or engine functions. Controller 162 may include all the components required to run an application, such as, for example, a memory, a secondary storage device, and a processor, such as a central processing unit or any other means known in the art for controlling exhaust after-treatment system 132. Various other known circuits may be associated with controller 162, including power supply circuitry, signal-conditioning circuitry, solenoid driver circuitry, communication circuitry, and other appropriate circuitry.

INDUSTRIAL APPLICABILITY

The system of the present disclosure may be applicable to any power unit, including, for example, passenger vehicles, vocational work trucks, construction and earth-moving machines, and other similar devices that operate in extreme cold and/or hot temperatures where proper operation of emission controlling devices may be a concern. The unique configuration of the disclosed exhaust after-treatment system may inhibit freezing and/or decomposition of a reductant supply such that emission control may be promoted efficiently. The operation of power unit 100 will now be explained.

Referring to FIG. 1, air and fuel may be drawn into the combustion chambers of power unit 100 for subsequent combustion to produce a mechanical work output and a flow of hot exhaust gases. The exhaust gas may contain a complex mixture of air pollutants, which can include oxides of nitrogen (NOx). As this NOx laden exhaust gas is directed from power unit 100 through exhaust system 104, NOx within the exhaust gas may be reduced by a chemical reduction process. In particular, as the exhaust gas enters exhaust system 104, reductant may be sprayed via injector 130 to mix with the exhaust gas flow. The combined gaseous mixture of exhaust gas and reductant may then pass downstream to catalytic substrate 134, where the reductant may convert at least a portion of the NOx to $N_2$ and $H_2O$. The reduced exhaust gas may then be released to the atmosphere.

Exhaust after-treatment system 132 may rely on a substantially constant supply of reductant. If the reductant supply is hindered, the after-treatment process described above may function improperly and power unit 100 may be required by industrial or governmental regulations to immediately cease operation. Such an event may occur when the temperature of the reductant drops below a reductant-freezing temperature. To inhibit reductant freezing, which often occurs during the night when temperatures are lowest and power unit 100 is non-operational, an insulating shell 158 may insulate secondary tank 138, thereby retaining heat absorbed from power unit 100 during the day within the reductant supply. Insulating shell 158 may also help prevent reductant from exceeding the decomposition temperature when environmental temperatures become excessive.

In the event that reductant within main and/or secondary tank 136, 138 does freeze or is nearing the freezing temperature, sensors 150, 152 may send an input to controller 162 to activate main and/or secondary heat sources 154, 156. The reductant within secondary tank 138 may thaw faster than the reductant within main tank 136 because it contains a smaller amount of reductant. Thus, exhaust system 104 may be supplied with reductant from secondary tank 138 with only minimal delay due to thawing. To further aid main heat source 154 in thawing the reductant within main tank 136, reductant from secondary tank 138 may be passed into main tank 136 via reductant supply line 140. As main heat source 154 extends generally from reductant supply line 140 to reductant exit line 142, main heat source 154 may create a flow passage within frozen and/or freezing reductant to allow liquid reductant to pass through main tank 136 and be returned to secondary tank 138 via reductant lines 142, 144, and controller 162. Alternatively, the liquid reductant may be passed to injector 130 via reductant line 148. Reductant circulating through the passage created by main heat source 154 may further aid main heat source 154 in thawing frozen reductant therein. Because the reductant passing through the passage created by main heat source 154 remains in contact with the frozen reductant of main tank 136, liquid reductant may permeate the frozen reductant and inhibit any insulating barrier of air from forming around main heat source 154. The locations of reductant lines 140, 142, and 146 near main and secondary heat source 154, 156 may inhibit frozen or freezing reductant from blocking the openings of reductant lines 140, 142, and 146.

The location of secondary tank 138 near power unit 100 can become problematic in some applications due to the high operating temperatures of power unit 100. To help prevent the decomposition of reductant, which can occur around 133° C., control system 160, given the appropriate input from sensors 150, 152, may shut off heat sources 154, 156 and/or prevent the circulation and passage of reductant from secondary tank 138. That is, for example, given an excessive temperature measured by sensor 152, controller 162 may stop the return of reductant from main tank 136 to secondary tank 138 and direct reductant within secondary tank 138 to empty into main tank 136 via reductant supply line 140. It is contemplated that this operation may also be preformed given an input from a sensor monitoring the temperature of power unit 100.

Prior to or subsequent to the shut down of power unit 100, control system 160 may refill secondary tank 138 with reductant for subsequent startup and operation of power unit 100. That is, given an input from an operator of power unit 100, a sensor monitoring the operational state of power unit 100, or any other means of determining power unit 100 is being or has just been shut down, controller 162, may direct reductant from main tank 136 to fill secondary tank 138 via reductant lines 142, 144. It is contemplated that control system 160 may delay refilling secondary tank 138 after shut down of power unit 100 for a predetermined amount of time known to allow the secondary tank 138 to cool below the reductant decomposition temperature. Alternatively, refilling secondary tank 138 may be delayed until control system 160 receives an input signal from sensor 152 indicative that the temperature of secondary tank 138 has reached an appropriate level where reductant being introduced therein will not decompose.

The operation of exhaust after-treatment system 132 may provide an efficient means for thawing reductant. Specifically, secondary tank 138 may reduce or eliminate operational delays of power unit 100 during cold weather conditions. In addition, because reductant may be circulated through the passage created in the frozen reductant of main tank 136 by main heat source 154, minimal air gaps may be formed that could inhibit the thawing of reductant. Also, the circulation of reductant through the passage created by main heat source 154 may allow liquid reductant from secondary tank 136 to facilitate the thawing of frozen reductant within main tank 138. The efficiency of reductant thawing may save an owner/operator of power unit 100 time and money by allowing power unit 100 to be operational quicker when starting in cold temperatures. The operation of exhaust after-treatment system 132 may also benefit a machine operated in hot conditions, or where the operational temperature of a machine reaches extreme temperatures. That is, the operation of exhaust after-treatment system 132 may prevent the decomposition of reductant by directing reductant away from secondary tank 138 when secondary tank 138 is located near an engine or other heat source It will be apparent to those skilled in the art that various modifications and variations can be made to the exhaust after-treatment system of the present disclosure without departing from the scope of the disclosure. Other embodiments will be apparent to those skilled in the art from consideration of the specification and practice of the exhaust after-treatment system disclosed herein. It is intended that the specification and examples be considered as exemplary only, with a true scope of the disclosure being indicated by the following claims and their equivalents.

What is claimed is:

1. An exhaust after-treatment system, comprising:
    a main tank sized to retain a first supply of reductant when full;
    a main heat source disposed within the main tank;
    a secondary tank sized to retain a second supply of reductant when full, the second supply being smaller than the first supply;
    a secondary heat source disposed within the secondary tank, wherein the main heat source is configured to heat the reductant in the main tank without heating the reductant in the secondary tank and the secondary heat source is configured to heat the reductant in the secondary tank without heating the reductant in the main tank; and
    a pump configured to pump reductant from the secondary tank to the main tank.

2. The exhaust after-treatment system of claim 1, wherein a reductant supply line directs the reductant from the secondary tank to an inlet of the main tank, and a reductant exit line delivers the reductant through an outlet of the main tank to an injector fluidly coupled to the main tank, wherein the main heat source extends from a location proximate the inlet to a location proximate the outlet.

3. The exhaust after-treatment system of claim 2, wherein the main heat source is positioned to melt a passage through frozen reductant in the main tank from the inlet to the outlet, and the reductant directed from the secondary tank to the main tank is passed through the main tank to the reductant exit line through the passage.

4. The exhaust after-treatment system of claim 1, wherein the secondary tank is sized to hold between about $1/5^{th}$ to $1/15^{th}$ a volume of reductant in the main tank.

5. The exhaust after-treatment system of claim 2, wherein the main heat source is an electric heater coil having a spiral configuration with a decreasing diameter from the location proximate the inlet to the location proximate the outlet.

6. The exhaust-after treatment system of claim 1, further including a controller configured to selectively direct reductant from the secondary tank to the main tank and to an injector.

7. The exhaust after-treatment system of claim 6, wherein the controller is configured to empty the reductant in the secondary tank when a temperature of the reductant in the secondary tank exceeds a threshold temperature, the threshold temperature being a value below a decomposition temperature of the reductant.

8. The exhaust after-treatment system of claim 7, further including, a first sensor disposed within the main tank and configured to generate signals indicative of a temperature of reductant therein; and a second sensor disposed within the secondary tank configured to generate signals indicative of the temperature of reductant therein.

9. The exhaust after-treatment system of claim 1, wherein the main tank and the secondary tank are fluidly coupled in parallel to an injector that is configured to inject reductant from exhaust after-treatment system.

10. The exhaust after-treatment system of claim 1, wherein the secondary tank includes a reductant inlet and a reductant outlet, and the secondary heat source extends from a location proximate the inlet of the secondary tank to a location proximate the outlet of the secondary tank.

11. A method of operating an exhaust after-treatment system, comprising:
thawing reductant stored in a main tank which holds a first quantity of reductant;
thawing reductant stored in a secondary tank which holds a second quantity of reductant and is positioned remote from the main tank, the second quantity being smaller than the first quantity;
directing reductant from the secondary tank to the main tank to facilitate the thawing of reductant in the main tank;
selectively directing reductant from the main tank and reductant from the secondary tank to an injector; and
removing the reductant from the secondary tank when a temperature of the reductant in the secondary tank exceeds a threshold temperature.

12. The method of claim 11, wherein thawing reductant in the main tank includes thawing a passage within the frozen reductant in the main tank using a heater that extends from a reductant inlet of the main tank to a reductant outlet of the main tank.

13. The method of claim 12, wherein directing reductant from the secondary tank to the main tank includes directing the reductant through the thawed passage within the frozen reductant.

14. The method of claim 11, further including injecting the reductant through the injector into an exhaust gas stream.

15. The method of claim 11, further including monitoring temperature of the reductant in the main tank and the secondary tank.

16. The method of claim 15, wherein removing the reductant in the secondary tank includes stopping a flow of reductant to the secondary tank, and directing reductant from the secondary tank to the main tank when the reductant temperature in the secondary tank exceeds a threshold temperature which is a value below a decomposition temperature of the reductant.

17. A power unit comprising:
an engine;
an exhaust system configured to direct a flow of exhaust gas from the engine to the atmosphere;
an exhaust gas treatment system including:
an injector configured to inject a reductant into the flow of exhaust gas;
a main tank sized to retain a first supply of the reductant and including a reductant inlet and a reductant outlet;
a main heat source disposed in the main tank and extending from a location proximate the inlet to a location proximate the outlet, the main heat source being configured to melt a passage in frozen reductant in the main tank from the inlet to the outlet;
a secondary tank sized to retain a second supply of the reductant, wherein the second supply is smaller than the first supply and wherein the main tank and the secondary tank are fluidly coupled in parallel to the injector; and
a pump configured to pump reductant from the secondary tank to the main tank to assist in the heating of reductant in the main tank.

18. The power unit of claim 17, wherein the control system is further configured to stop a flow of reductant into the secondary tank, and empty the reductant in the secondary tank when a temperature of the reductant in the secondary tank exceeds a threshold temperature, the threshold temperature being a temperature below a decomposition temperature of the reductant.

19. The power unit of claim 17, further including a control system that is configured to monitor a temperature of the reductant in the secondary tank and empty the secondary tank when the temperature exceeds a threshold temperature.

20. The power unit of claim 17, wherein the main tank and the secondary tank are positioned remote from each other.

* * * * *